US006604124B1

(12) United States Patent
Archbold

(10) Patent No.: US 6,604,124 B1
(45) Date of Patent: Aug. 5, 2003

(54) SYSTEMS AND METHODS FOR AUTOMATICALLY MANAGING WORK FLOW BASED ON TRACKING JOB STEP COMPLETION STATUS

(75) Inventor: Janice K. Archbold, West Chester, PA (US)

(73) Assignee: A:\Scribes Corporation, West Chester, PA (US)

( * ) Notice: Subject to any disclaimer, the term of this patent is extended or adjusted under 35 U.S.C. 154(b) by 0 days.

(21) Appl. No.: 09/694,884

(22) Filed: Oct. 24, 2000

Related U.S. Application Data

(63) Continuation of application No. 09/041,839, filed on Mar. 12, 1998, now abandoned.
(60) Provisional application No. 60/040,753, filed on Mar. 13, 1997.

(51) Int. Cl.$^7$ ............................................... G06F 15/16
(52) U.S. Cl. ..................... 709/103; 709/219; 709/217; 709/201
(58) Field of Search ................................ 709/217, 219, 709/103, 201; 701/106; 705/7, 8

(56) References Cited

U.S. PATENT DOCUMENTS

| | | | |
|---|---|---|---|
| 3,648,249 A | 3/1972 | Goldsberry ............... 340/172.5 |
| 4,272,813 A | 6/1981 | Howell et al. .............. 364/900 |
| 4,319,337 A | 3/1982 | Sander et al. ............... 364/900 |
| 4,817,127 A | 3/1989 | Chamberlin et al. .......... 379/67 |
| 4,856,069 A | 8/1989 | Kolodny et al. .............. 381/52 |
| 4,860,339 A | 8/1989 | D'Agosto, III et al. ........ 379/67 |
| 4,969,136 A | 11/1990 | Chamberlin et al. .......... 369/29 |
| 4,975,896 A | 12/1990 | D'Agosto, III et al. ........ 369/29 |
| 5,095,524 A | 3/1992 | Watanabe .................... 395/650 |
| 5,146,439 A | 9/1992 | Jachmann et al. ............ 369/25 |
| 5,163,085 A | 11/1992 | Sweet et al. .................. 379/89 |
| 5,179,627 A | 1/1993 | Sweet et al. ..................... 395/2 |
| 5,261,052 A | 11/1993 | Shimamoto et al. ......... 395/200 |
| 5,481,698 A | 1/1996 | Itoh et al. .............. 395/185.01 |

(List continued on next page.)

Primary Examiner—Le Hien Luu
Assistant Examiner—Stephan Willett
(74) Attorney, Agent, or Firm—Woodcock Washburn LLP

(57) ABSTRACT

A system is disclosed that includes one or more "HOME"s where there is a (1) "DAD" computer and software system for human User interaction to initiate Jobs (Transcription, Translation, Data Entry, and Transaction Creation) and to utilize voice-mail through real-time voice and tone signal input and (2) "HIS" computer and software system or keeping the databases used to process Jobs and for keeping the statistical records of jobs for analysis, general ledger, payroll and billing. In addition the system includes one or more "MOM"s where there is a software system server on a computer set on the backbone of a global communication network (e.g. Internet) that (1) receives Job packets from its HOMEs, (2) selects Scribes for work (e.g. transcription), (3) generates messages in the form of E-Mail and Voice-Mail to specified users for action, (4) updates the status of the Job Record and transferring that updated Record to a SUPERMOM, (5) implements all the details of job processing steps and logic that has been controlled by Human Supervisors. The system may further include a "SUPERMOM" where there is a software system server on a computer set on the backbone of the global computer network (e.g. Internet) that receives Job Packets from MOMs where portions of the job are spread over two or more MOMs; SUPERMOM directs and transfers that job data; receives Job Record updates and maintains a Site for on-line internet job tracking inquiries; SUPERMOM selects Scribes for Jobs that are not able to find an available Scribe within their own MOM's HOMEs, collects the statistical and financial data from all the HOMEs, and provides general top level management decision making information.

14 Claims, 1 Drawing Sheet

U.S. PATENT DOCUMENTS

| | | | |
|---|---|---|---|
| 5,490,097 A | | 2/1996 | Swenson et al. ............. 364/578 |
| 5,530,740 A | | 6/1996 | Irribarren et al. ............. 379/89 |
| 5,530,861 A | * | 6/1996 | Diamant et al. |
| 5,537,543 A | | 7/1996 | Itoh et al. ............... 395/185.01 |
| 5,557,736 A | | 9/1996 | Hirosawa et al. ....... 395/182.02 |
| 5,608,786 A | | 3/1997 | Gordon ....................... 379/100 |
| 5,625,675 A | | 4/1997 | Katsumaru et al. ............ 379/67 |
| 5,633,916 A | | 5/1997 | Goldhagen et al. ............ 379/67 |
| 5,655,081 A | | 8/1997 | Bonnell .................. 395/200.32 |
| 5,684,956 A | | 11/1997 | Billings ................. 395/200.03 |
| 5,689,625 A | | 11/1997 | Austin ......................... 395/114 |
| 5,737,395 A | | 4/1998 | Irribarren ..................... 379/88 |
| 5,742,762 A | | 4/1998 | Scholl et al. ............ 395/200.3 |
| 5,754,306 A | | 5/1998 | Taylor et al. ............... 358/400 |
| 5,757,891 A | | 5/1998 | Wang ..................... 379/93.24 |
| 5,761,404 A | | 6/1998 | Murakami et al. ...... 395/182.13 |
| 5,765,140 A | * | 6/1998 | Knudson et al. |
| 5,828,730 A | * | 10/1998 | Sebryk et al. |
| 5,867,495 A | | 2/1999 | Elliott et al. ................. 370/352 |
| 5,870,549 A | | 2/1999 | Bobo, II ................. 395/200.36 |
| 5,875,436 A | * | 2/1999 | Kikiinis |
| 5,884,256 A | * | 3/1999 | Bennett et al. |
| 5,915,001 A | | 6/1999 | Uppaluru ................. 379/88.22 |
| 5,928,325 A | | 7/1999 | Shaughnessy et al. ...... 709/206 |
| 6,122,614 A | * | 9/2000 | Kahn et al. |
| 6,128,380 A | * | 10/2000 | Shaffer et al. |
| 6,170,011 B1 | * | 1/2001 | Macleod Beck et al. |
| 6,175,822 B1 | * | 1/2001 | Jones |
| 6,298,326 B1 | * | 10/2001 | Feller |
| 6,381,640 B1 | * | 4/2002 | Beck et al. |

* cited by examiner

SYSTEMS AND METHODS FOR AUTOMATICALLY MANAGING WORK FLOW BASED ON TRACKING JOB STEP COMPLETION STATUS

CROSS REFERENCE TO RELATED APPLICATIONS

This application is a continuing application of Ser. No. 09/041,839 filed Mar. 12, 1998, now abandoned, (which claims priority under 35 U.S.C. §119(e) from the following U.S. provisional patent applications: provisional patent application Ser. No. 60/040,753 filed Mar. 13, 1997) incorporated herein by reference.

FIELD OF THE INVENTION

This present invention relates to hardware, software, and methods and processes of using them in a system for automatic electronic document processing. One application of the present invention includes transcription, including automated assignment of jobs to widely-scattered individual scribes, automated management of billing information, and providing for scribe queries of authors. Another application of the present invention includes multimedia and electronic file creation, allowing authors to create multimedia documents even though the authors are interacting with the system solely through a standard telephone connection. Portions of the invention are preferably implemented over a global communication network (e.g. the Internet).

SUMMARY OF THE INVENTION

The system of the present invention consists of (A) one or more "HOME"s, connected to an internet provider not more than two "hops" away from the internet backbone, where there is a (1) "DAD" computer and software system for human User interaction to initiate Jobs of Transcription, Translation, Data Entry, and transaction creation and to Input at Job Steps, and to utilize Voice-Mail through real-time voice and tone signal input and (2) "HIS" computer and software system for keeping the Databases used to process Jobs and for keeping the statistical records of jobs for analysis, general ledger, payroll and billing: (B) one or more "MOM"s where there is a software system server on a computer set on the backbone of the internet that receives Job packets from its HOMEs that includes a Job Record, and directs the Job Packet to its current destination according to its current status, by a combination of placing it in a designated Directory, transferring specified parts to designated HOME's DAD Mail-Boxes, selecting Scribes for transcription, generating Electronic Worker Messages in the form of E-Mail and Voice Mail to specified Users for information or action, updating the status of the Job Record and transferring that updated Record to SUPERMOM, and all the details of job processing steps and logic that has been controlled by Human Supervisors; and (C) "SUPERMOM" where there is a software system server on a computer set on the backbone of the internet that receives Job Packets from MOMS where portions of the job are spread over two or more MOMS and then SUPERMOM directs and transfers the job data; receives Job Record updates and maintains a Site for on-line internet job tracking inquiries; selects Scribes for Jobs that are not able to find an available Scribe within their own MOM's HOMES, collects the statistical and financial data from all the HOMEs, and provides the general top level management decision making information for its large international company.

The invention provides a system for the creation and management of electronic files in the performance of jobs, comprising: a) a MOM computer being associated with a plurality of HOME computers with which said MOM computer communicates; b) each of said HOME computers comprising a first programmed computer system for receiving input from a User and for generating Job Packets and further for providing a plurality of Mail-Boxes for storing input; e) each of said HOME computers further comprising a second programmed computer system for keeping and updating databases used to process jobs and for keeping and updating statistical records of jobs; f) said MOM computer comprising a server in communication with a global communications network and further comprising means for accepting input from Supervisors; said server comprising means for receiving Job Packets from each of said HOME computers associated with said MOM computer; i) wherein each of said Job Packets includes a Job Record, said Job Record comprising Job Data; ii) said server comprising means for receiving a Job Packet and for directing it to a current destination specified in the Job Data thereof; iii) said server comprising means for directing a part of a Job Packet to a Mail-Box on any HOME computer in the system; iv) said server comprising means for selecting Scribes for transcription; v) said server comprising means for generating Electronic Worker Messages in the form of email and voicemail to specified Users for information or action;

g) said server comprising means for updating the status of a Job Record and further comprising means for transferring said updated Job Record to the SUPERMOM computer; and h) said server comprising means for performing job processing steps and logic in response to input from Supervisors.

The invention further provides a system for the creation and management of electronic files in the performance of jobs, including a) a plurality of MOM computers; b) each of said MOM computers being associated with a plurality of HOME computers with which said MOM computer communicates; c) a SUPERMOM computer being associated with a plurality of MOM computers with which said SUPERMOM computer communicates; d) each of said HOME computers comprising a first programmed computer system for receiving input from a User and for generating Job Packets and further for providing a plurality of Mail-Boxes for storing input; e) each of said HOME computers further comprising a second programmed computer system for keeping and updating databases used to process jobs and for keeping and updating statistical records of jobs; f) each of said MOM computers comprising a server in communication with a global communications network and further comprising means for accepting input from Supervisors; said server comprising means for receiving Job Packets from each of said HOME computers associated with said MOM computer; i) wherein each of said Job Packets includes a Job Record, said Job Record comprising Job Data; ii) said server comprising means for receiving a Job Packet and for directing it to a current destination specified in the Job Data thereof; iii) said server comprising means for directing a part of a Job Packet to a Mail-Box on any HOME computer in the system; iv) said server comprising means for selecting Scribes for transcription; v) said server comprising means for generating Electronic Worker Messages in the form of email and voicemail to specified Users for information or action; g) said server comprising means for updating the status of a Job Record and further comprising means for transferring said updated Job Record to the SUPERMOM computer; h) said server comprising means for performing job processing steps and logic in response to input from Supervisors; i) said SUPERMOM computer comprising means for receiving Job Packets from MOM computers where portions of the job are spread among a plurality of said MOM computers, and said SUPERMOM computer directs and transfers said Job Data;

j) said SUPERMOM computer comprising means for receiving Job Record updates and further comprising means for tracking jobs; and k) said SUPERMOM computer further comprising means for assigning a Scribe at a second MOM computer to a job in the event that no Scribe is available at a first MOM computer at which the job originates.

The invention further provides a machine readable medium comprising programming instructions for a HOME computer wherein said HOME computer is programmed: a) for receiving input from a User and for generating Job Packets and further for providing a plurality of Mail-Boxes for storing input; b) for keeping and updating databoxes used to process jobs and for keeping and updating statistical records of jobs; and c) for communicating with a MOM computer.

There are many advantages to the present invention. In the prior art, the number of Scribes available for work was limited in a few fashions. First, many prior art systems for handling transcription have hard-wired limits. Some prior art hardware supports a limited number of terminals, such as 12, at which transcribers and editors work. Second, since a human job manager monitors and assigns jobs, the human job manager can only effectively supervise up to about 12 people. The first limitation of the prior art can be overcome in the system of the present invention; more Scribes can be added by expanding the implemented system. Second, the system of the present invention does not require a human monitor; jobs are assigned by the system depending on the availability of qualified Scribes.

It is a further advantage that the Scribes can connect to the system through telephone or Internet connections so that the Scribes preferably constitute a distributed workforce. This eliminates the need for on-site transcription: sites near hospitals (or other customers for transcription or related services) are expensive. Indeed, it is not necessary to maintain any additional office space off-site for groups of Scribes to use as a workspace. Scribes can telecommune if they have the proper hardware and software (the 'terminal' for the present invention can be a standard personal computer (or equivalent networked computer or similar "thin client" terminal). The advantages in saved time, energy expended in travel, flexibility in scheduling are all some of the advantages of the present invention.

As a distributed workforce whose productivity, qualifications, and responsiveness can be tracked, Scribes can be paid on their production. Scribes who take the time to acquire more training, for example, will be able to command a higher rate of pay for those jobs that demand additional skills.

It is another advantage of the present invention that Job Transaction information is available. The information can provide information about Scribes (productivity, billing information, qualifications, availability in real-time, projected availability, frequency of queries to authors, ability to update their own schedule in real-time, etc.), Authors Oob status, frequency that Scribes have to communicate with the Author to obtain answers to queries, etc.), HOMEs (e.g. the HOME is 'farming out' a lot of Scribe work to other HOMES in a particular subject area suggesting that additional training and/or personnel are required) and others. Prior art systems do not allow for the real-time capture and subsequent analysis of Job Transaction information.

It is a great advantage of the present invention that an Author can create a multi-content file while working from a standard push-button telephone, anywhere in the world. Armed with a phone machine equipped with a fax, and an Author can create multi-content and multi-media documents for inclusion in an electronic file. For example, an attorney can dictate a memo regarding a personal injury case into the system, fax a copy of an offer of settlement for transcription and a visual attachment of x-rays of the client's injuries into the same electronic file. The present invention is not limited to mere dictation and transcription: faxes, computer files, audio, video, and other elements can be included in Jobs and assembled by appropriately qualified and equipped Scribes.

The present invention can have many ways to deliver the electronic file back to its Author and others. While the audio is being transcribed, certain Authors will have the ability to forward notice that the audio is available to certain other Users (Listeners). For example, a radiologist can dictate her review of an X-ray and forward that information to selected Listeners. The final transcripted product may then be written out to a file, database and/or printed.

BRIEF DESCRIPTION OF THE DRAWING

The present invention, both as to its organization and its manner of operation, together with further objects and advantages, may be best understood by reference to the following description, in connection with the accompanying drawings.

DESCRIPTION OF PREFERRED EMBODIMENTS

Figure 1:
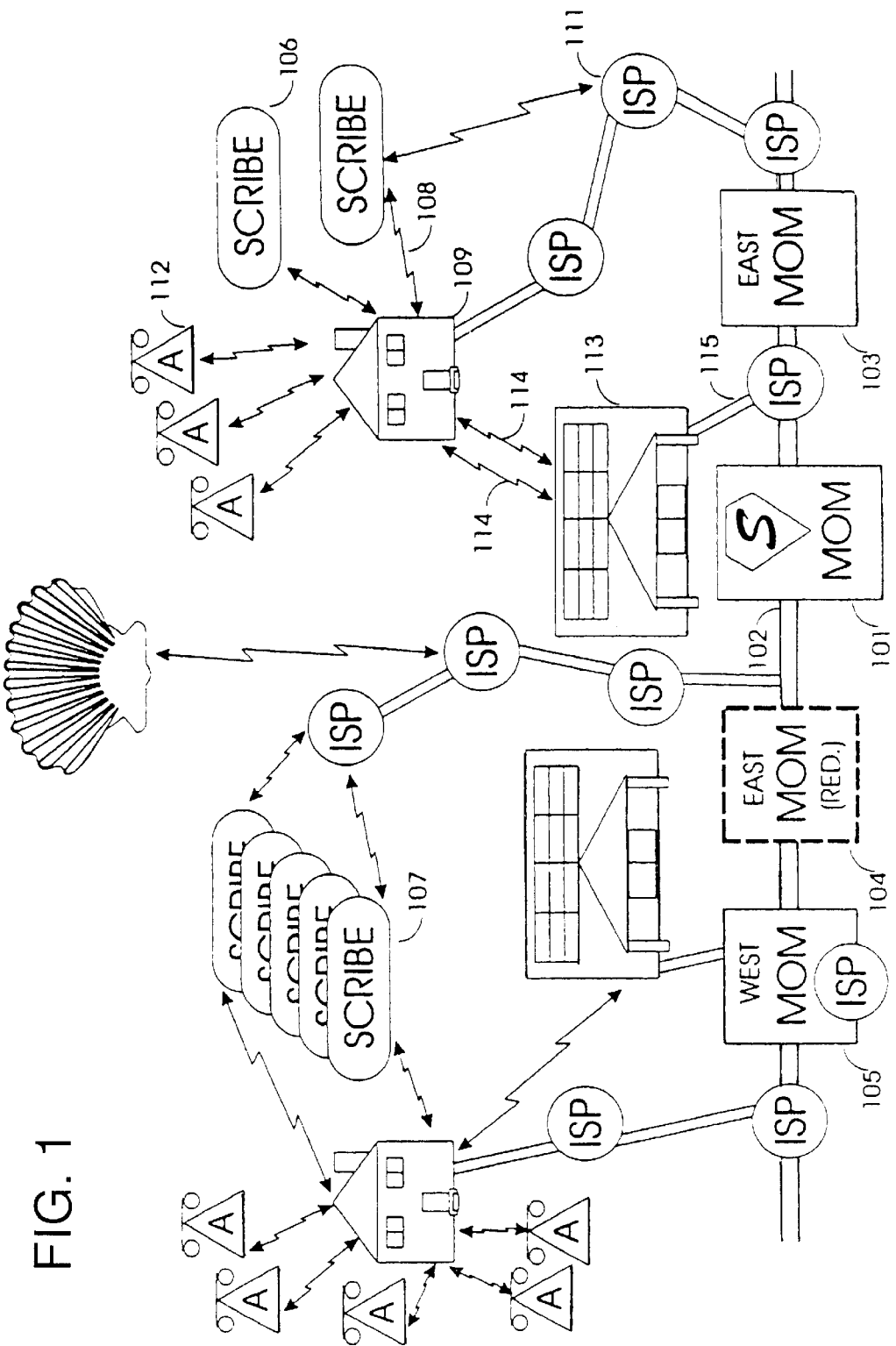
FIG. 1 shows a preferred representation of the present invention.

The system of the present invention consists of (A) one or more "HOME"s, connected to an internet provider not more than two "hops" away from the internet backbone, where there is a (1) "DAD" computer and software system for human User interaction to initiate Jobs of Transcription, Translation, Data Entry, and transaction creation and to Input at Job Steps, and to utilize Voice-Mail through real-time voice and tone signal input and (2) "HIS" computer and software system for keeping the Databases used to process Jobs and for keeping the statistical records of jobs for analysis, general ledger, payroll and billing; (B) one or more "MOM"s where there is a software system server on a computer set on the backbone of the internet that receives Job packets from its HOMEs that includes a Job Record, and directs the Job Packet to its current destination according to its current status, by a combination of placing it in a designated Directory, transferring specified parts to designated HOME's DAD Mail-Boxes, selecting Scribes for transcription, generating Electronic Worker Messages in the form of E-Mail and Voice-Mail to specified Users for information or action, updating the status of the Job Record and transferring that updated Record to SUPERMOM, and all the details of job processing steps and logic that has been controlled by Human Supervisors; and (C) "SUPERMOM" where there is a software system server on a computer set on the backbone of the internet that receives Job Packets from MOMs where portions of the job are spread over two or more MOMs and then SUPERMOM directs and transfers the job data; receives Job Record updates and maintains a Site for on-line internet job tracking inquiries; selects Scribes for Jobs that are not able to find an available Scribe within their own MOM's HOMEs, collects the statistical and financial data from all the HOMEs, and provides the general top level management decision making information for its large international company.

MOM Sites and the SUPERMOM Site have fail-safe systems for transferring their operation to a redundant site in another power grid when their main site can no longer sustain an effort to operate with a general power failure or with a "glitch" in the internet system.

DAD includes a system controller which is based on a 32/64 bit Pentium Pro microprocessor operating at not less than 300 megahertz under real time enhanced UNIX System and is capable of concurrent processing under UNIX. (Pentium is a trademark of Intel Corporation and UNIX is a trademark of ATT Corp.) The system includes not less than 100 megabytes of RAM, 3 serial ports, 20 gigabytes removable hard disk drives, a 3¼ inch floppy disc drive, and Read/Write CD drive and from 12 to 96 voice/fax ports. The system is provided with a basic voice operating system, running under UNIX which provides the basic functions necessary for any voice storage and retrieval system; interfaces to trunk lines, analog to digital conversions for voice file storage and digital to analog conversions for voice file retrieval for Author editing and review and voice mail Subscribers (listeners). The system is provided with a basic fax/modem operating system, running under UNIX which provides the basic functions necessary for any fax file storage, retrieval and transmission system: interfaces to trunk lines for fax receipt from Users, fax-back transmission to Users and Guests. DAD is connected to an internet provider by direct connection by the lowest bytes per second at T-1 (1.5) up to T-3 (or higher as appropriate bandwidth becomes economically feasible). DAD has a Power-Over Mode that is used during a power failure, from battery back-up to an electric generator. It has a Power-Down Mode that is used when the generator is calculated to fall for want of fuel, finishing those jobs that it can, not accepting new jobs, sending Electronic Worker Messages to MOM and SUPERMOM, sending E-Mail Messages to Authors and Clients who will have their jobs suspended and gracefully going into a Power Down and Out mode. On Restart, Dad knows it is not starting for the first time because it has retained memory of its Identity and its Power Down Status. It Powers Up resettling all of its indicators to continue with the Pending Jobs, sending out those same messages saying that it is back in business.

His can be either a part of the physical components of DAD or connected to DAD through a MIS connection. HIS is a 32/64 bit Pentium Pro microprocessor operating at not less than 300 megahertz, with not less than 100 megabytes of RAM, 2 serial ports, 1 parallel port, not less than 10 gigabytes removable hard disk drives, a 3¼ inch floppy disk drive, a Read/Write CD drive. HIS is connected to the Internet by direct connection by the lowest bytes per second at 56 KB to T-1 (1.5) to T-3. There is a MICROSOFT WINDOWS NT operating system and MICROSOFT SQL server. HIS has battery back-up and is connected to an electric generator.

MOM and Supermom software resides on a system controller similar to an IBM 700 server running under UNIX in a Windows NT Environment/MICROSOFT SQL server with 18 slots for "hot swappable" hard disks, minimum 200 megabytes of RAM, utilizing RAID system drive check and recovery system, providing the basic functions of a WEB server for on-line access, storage and transfer of files for the HOMEs systems. Sizing of the hard drive capacities and bandwidth will depend on the number of HOMEs under the regional MOMs. Supermom is the controller of work flow between MOMs and is the repository and server for job tracking and statement information for Scribes and Clients that span MOMs.

Users of the system interact with the system through POT lines calls to DAD for voice or fax interaction, and through the Internet to MOM and SuperMOM for movement of files and viewing of status. Jobs are initiated by voice calls to DAD. If a job entails transcription the system may prompt for template to be used. Some templates are for word-processing or data-entry by the transcriptionists and/or by independent speech recognition pre-processing software of the dictated information; and some templates are for voice-prompted interactive software processing where the user is directed to "fill in" a voice form that will be transcribed by a transcriptionist and/or by independent speech recognition pre-processing software to a word-processing or data-entry form.

When a job is ready for Transcription, DAD passes the VOX File along with a skeleton Job Record Transaction and the appropriate Template from its storage on HIS to MOM via an FTP. MOM takes the Job Packet, and inspects for accompanying modem-IP files and their number, updates the Job Record Status, FTPs that Status update to SUPERMOM, Date/Time stamps, creates a Job Sub-Directory under the Client/Author/Template Directory, selects a Scribe using algorithms (such as discussed herein below) with the Scribe Database Record, the Scribes ON-LINE and the Job's Priority and the calculated transcription time versus the priority. If there is too much work to be accomplished in the priority time, Mom tries to split up the job into segments using the specially-generated Segment Markers imbedded in the VOX by the DAD software on receipt of "Page" and "Section" commands for the transciption. If the VOX cannot be segmented, an Electronic Worker Message is generated to the Author and specified Client User's Voice-Mail Box and E-Mails are also sent advising of the projected delay. If the Job can be segmented, the VOX is broken up and Sub-Jobs are created and the Author and Client are advised of the number of Sub Jobs by Voice-Mail and E-Mail. If Scribes are not available, MOM FTP sends the JOB Packet to SUPERMOM for processing as follows: When the Scribe is selected, an Electronic Worker Message is created in Voice-Mail and E-Mail, Job Sub-Directories are created under their In-Basket Directory and the VOX from DAD is translated to a Real-Audio® (or equivalent) file which is placed in their Job Directory, if the job contains fax input files from the Author, and/or modem-IP files from the client, MOM or SUPERMOM goes to the Job Directory of the Client/Author/Template/Job and places those files in the Scribe's In-Basket. If the Job included any file that was to be sent by the Client and was not, MOM notifies the Client by electronic message, and waits until the missing files are supplied before sending the Job to a Scribe. The Job Record Status is updated and there is a Status update, Date/Timestamp to SUPERMOM. A clock begins ticking for the Scribe to download the job. If it is not downloaded within time to transcribe, the Scribe is notified of the Job's removal and the entire proceeding is repeated for the next selected Scribe. When the job is downloaded by the Scribe by FTP, Job Sub-Directories are created for their Out-Basket, the Job Record Status is updated and a copy is sent by FTP to SUPERMOM. When the Job is completed, the Scribe uploads by FTP to her Out-Basket. The Job Record Status is updated, a copy is sent to SUPERMOM and (1) if the Job requires a preview by the Author, the transcription is sent by FTP to the Author's Home DAD for fax, an Electronic Worker Message is created to the Author and sent to the Author's Home DAD for placement in their Voice-Mail Box, an E-Mail message is created and sent to the Author if he has an E-Mail Address and the Job is put on a pending status waiting for an electronic message back from the HOME's DAD that the fax has been sent, whereupon the Job's TIME-OUT clock for acceptance begins ticking based on an algorithm equal to the designated priority; it reaches acceptance if the job is not rejected by the Author by Voice-Mail Reject, and the times runs out or if the Author makes a voice-Mail Accept and (2) the transcription file is placed in the Client/Author/Template in Box Directory and if the job has not already been accepted as in (1) above, the TIME,OUT begins when the file is placed in the Client's directory. The Job Record Status is updated and a copy sent to SUPERMOM. On download, the Job Record Status is updated, Date/time stamped, a copy sent to SUPERMOM, and on acceptance by TIMED-out or Acceptance by the Author and the Client has downloaded the file, the Job Record Status is updated, Date/time stamped and a copy sent to SUPERMOM. The Scribes directories for that job are cleared as well as the Client's directories.

Scribes are notified of work pending that is outside of their contracted time range when the work is of an urgent nature to the system: Generated electronic messages will be sent by e-mail to the Scribe and by phone call to the Scribe's designated voice phone line or pager from the Scribe's HOME's DAD.

If the Job is rejected by the Author, an Electronic Worker Message is created for the Scribe's Mail-Box, an E-Mail is created, the Job Record Status is updated, a copy sent to Mom, the Author's VOX file for the Reject is sent to the Scribe's HOME's DAD and a fax file, if included in the Reject Job Packet, is placed in the Scribe's Job directory in their In-Basket. If MOM finds that the transcribing Scribe is not available or will not be available for the correction, she creates an Electronic Worker Message, and an E-Mail Message to the Scribe to be answered in x minutes, and if the Scribe Times-out, the Scribe's transcribed file, the Job's input files, and the Job's correction VOX with possible Fax File are removed from the Scribe's Directory, an E-Mail Message is created to the Scribe's Home, a transaction noting the reject is made to the Scribe's Database Record, and the entire Job is placed in the next available Scribe's created directories. After the correction is made, the transcribed file is uploaded to the Scribe's Out-Box, and the whole process of acceptance as detailed in the preceding paragraph begins anew.

Scribe-Query Requests to Authors for clarification of their Transcription are initiated by the Scribe through their web-page connection to MOM with a Scribe-Query Request Transaction: they can give a voice-mail message for the Author of their current Job that includes a "clip" of the Real-Audio® file; the Heading and Subject are generated by an Electronic Worker; MOM transfers the message to the Author's HOME's DAD; DAD places the voice-mail in the Author's Voice-Mail box for play-back the next time the Author calls in. The Scribe receives the Author's reply by downloading the reply audio file that was placed in the Scribe's in Basket by MOM. The entire procedure is documented by updates to the Job Record.

Some Transcription Jobs, if using certain templates, are not completed until the content of the Job has been analyzed and processed by a template-specific software program: certain transcription documents need to be analyzed for word-specific strings that when taken together and compared to indices of codes, will result in the document having system-generated data associated with it. In these cases, the files that are delivered back to the Client will include more content than was originally supplied by the Author and the template.

Voice-Mail-send Jobs to Recipients within a HOME never leave the Home for processing. If the Voice-Mail Recipient is at another Home within the same MOM, the VOX file is sent FTP with the Job Record to MOM who sends it FTP to the Recipient's HOME's DAD, where it is placed in the Recipient's Voice-Mail Box. If the Recipient is at a HOME on another MOM, the Job Packet is sent via SUPERMOM to the MOM of the Recipent's Home, and that MOM sends the VOX to the Recipient's HOME's DAD for placement in their Mail-Box.

Voice-Mail-receive Jobs from Users listening to their Voice-Mail never leave the HOME. If a User within a Client Group calls into a Foreign HOME to receive Voice-Mail from his own HOME, DAD creates a temporary Mail-Box for the User by JOB-ID, tells the User the Job ID, the Job Record Transaction is sent out from the Foreign Home to its MOM who either sends it on to SUPERMOM or sends the transaction to the User's HOME DAD. The User's HOME DAD sends the VOX out with the Job Record Transaction to its MOM who either sends it on to SUPERMOM or to the HOME's DAD where the transaction began and DAD places the VOX in the temporary Mail-BOX.

Voice-Mail Jobs not involved in the critical steps of transcription processing are not sent to SUPERMOM for job status inquiry. The status is updated so that the transmitting DADs and MOMs know what step they are at in fulfilling a job.

Voice-Mail Report Jobs are part of a Transcription Job. Their recipients can be at a foreign HOMEs within a MOM or at another MOM, but they are members of a Client Group. After receipt of a Voice-Report, the Recipient can request a fax-back of the transcribed document. It is likely that the transcribed document is not finished at the tme of the Recipient's Listening. Therefore, Transcription Jobs that include Voice-Mail Reports are not completed until they send the Transcribed Document to the Recipient's Home for fax transmission by DAD for fax-back to the Recipient.

Transcribed reports can be fax-back documents for Guest Users designated by the Author at the time of dictation. Guests call into the system as a "Guest", giving the generated password and Document ID that was given to them (outside of the system) by way of the originating Author.

At the end of any job that had to leave DAD for MOM, the Job Record(s) in its final state is sent to the HOME's HIS for transaction to the HOME's JOB Files for analysis, general ledger, payroll and billing.

E-mail transcription jobs are transcribed on a non-formatted generic template and handled as a simplified transcription job with delivery to one or more e-mail addresses as specified by the Author at the time of dictation using indices of HOME user(s)' addresses and/or Author's addresses for delivery.

Transcription jobs that result in a formatted document can be sent by an Author as an attachment via e-mail to one or more e-mail addresses as specified by the Author at the time of dictation using indices of HOME user(s)' addresses and/or Author's addresses for delivery.

Transcription Jobs do not necessarily result in a file that is to be printed. Even if the template is for a document, the destination of the document may not be a printer. Conversely, if the template is for a transaction to be applied to a database one of the destinations of the file may be a printer. Transcription Jobs may contain only the slightest vestiges of audio input with the majority of the source being supplied by supplemental files for the job by FTP to the HOME's MOM's internet site.

Transcription Jobs that create documents can create a file that contain multiple pages. Transcription Jobs that create database transactions can create a file that contains multiple records. Transcription Jobs that create electronic files of any type can contain multiple parts that make the whole as multiple "web" pages make a "site".

Translation Jobs are different from Transcription Jobs in the following details: All Translation Jobs require the file that is to be translated to accompany the job. Preferably, translations are made from a file and not from an audio source. If other electronic input is needed to complete the work, then the completed translation file would be input to a Transcription Job in the normal manner, but preferably to a HOME operating in the translated language.

Scribes are persons who key-in data to an electronic template, using a keyboard (or other input device as appropriate—for example, a drawing tablet), creating an electronic file. The source data is in the form of audio or any electronic file that will be used to partially or completely create the final electronic file: an electronic record can be partially completed by transcribing from an audio file, and by a graphics file to be embedded, and by a faxed file to be visually interpreted and/or transcribed; a multi-media transaction record can be partially completed by all the above, and additionally an audio-video file; and finally, electronic records can be created from sources that capture all the senses that have already been or will be, sometime in the future, recorded electronically.

Provisional Scribes have been pre-qualified through an interactive website program. Provisional Scribes are assigned to a HOME and are currently being qualified for a particular level of work by their HOME's Scribe Coordinator (Personnel). A Provisional Scribe "shadows" the transcription of an Assigned Scribe. A computer program compares the output of the Provisional Scribe with the output of the Assigned Scribe. The comparison document, results and scoring are forwarded as a Job to the HOME's Scribe Coordinator (Personnel) for handling appropriate to the situation (for example, qualifying the Provisional Scribe for the higher level or type of work). For some types of work, it may be necessary for the Scribe to be qualified by a human person (i.e. where design, drawing or translation skill is required) but for most transcription the scoring can be handled by computer.

Compared Double Key Document Production is a function required for some templates when the highest degree of accuracy "mission critical" is contracted by the Client. In the case of transcription from an audio or faxed visual source, the original source is used as input to the Job's Secondary Scribe (can be a human transcriptionist or "speaker independent voice translator" or Optical Character Recognition translator). The original source is sent with the transcribed record to the Job's Primary Scribe where the transcription is shown on their monitor. If the original source was a graphic representation it is shown with the transcription as split-screen windows, each synchronously scrolling line by line at an adjustable pace until a keyed halt for editing by the Scribe. If the original source was voice, the voice is "played" in synchrony with each line at an adjustable pace until a keyed halt for editing by the Scribe.

Proofing Scribes are assigned by HOME personnel to Jobs "on the fly" at random. The HOME personnel can "tag" the Scribe's User record so that all jobs are proofed until the tag is removed, or the HOME personnel can tag a job for proofing "in transit", during the elapsing time that the electronic file is being created, before it is completed and the completed file uploaded by the Scribe. When a Job has been targeted for proofing, the Job is sent to any one of the HOME's designated proofing Scribes, provided the proofing will not make the job late for delivery (a systems generated e-mail to the requesting HOME coordinator will be sent on non-compliance of requests). The original source is sent with the completed file to the Job's Proofing Scribe where the transcription is shown on their monitor. If the original source was a graphic representation it is shown with the transcription as split-screen windows, each synchronously scrolling line by line at an adjustable pace until a keyed halt for editing by the Scribe. If the original source was voice, the voice is "played" in synchrony with each line at an adjustable pace until a keyed halt for editing by the Scribe. The proofed job that is up-loaded by the proofing Scribe will be the job that is delivered to the client. The two versions are compared by the comparison computer program that is used for Provisional Scribes, with the results being forwarded to the HOME's Scribe Coordinator or other designated HOME personnel.

USERS

Users are persons who have initial access to the A:\Scribes system through the phone-line ports. All jobs of Transcription, Transaction or Voice-Mail are initiated by a call to "Home" (a franchise location) where a modified and enhanced digital voice processing computer and software portion of the invention resides and is referred to in these documents as "DAD". The Database Records of the Home are kept on a Management Information System computer, referred to in these documents as "HIS", that is attached to DAD. Both DAD and HIS are attached to the Internet.

All Users have a U-USER-ID unique to their HOME. That with the combination of U-USERNAME makes them unique to the universal system.

When a User pays an initial visit to Home they have some work to do to set up their Mail Box at least; setting up their access to the A:\SCRIBES sites; and (depending on Class) setting up their information on the Home Database. For the Home Database Record, Home Personnel put in the initial information creating a skeleton record for the highest level of User (Group if applicable), then the User fills in the fields that they have access to by pre-recorded prompts, whereupon it becomes a Job for transcription and the transcribed document becomes a transaction to the Home Database. When the User is setting up their Mail-Box they respond to pre-recorded prompts to create a Name Header that will go with all their Voice-Mail Messages—their name . . . "Dr. John J. Jones". They set up their password to the Voice-Mail (A:\SCRIBES) system which should be the same password that they use for viewing their section of the Home Site. When a User creates a Voice-Mail Message they will be prompted to specify the message's subject . . . (e.g. "Patient Record 497845-Jane Doe") creating a Subject Header.

When a User accesses their Voice-Mail In-Box, they are told the number of New Messages they have, and the number of Saved Messages they still have. They are presented first with any Electronic Worker Message(s) by FIFO. Then they are presented with any Scribe Query Request Messages (FIFO) to which they must respond before continuing, then, with general FIFO messages with its Name Header and Subject Header. The Listener can direct the system to retrieve the next record without listening to the entire message, at any time in the Listening Process. The Listener can direct the system to go forward or backward within a message by 3 second intervals; go to the beginning or end of the message. The Listener can direct the system to give the day and time of the message. The Listener can direct that a Message be saved (for n days). After the Listener has proceeded into the body of the Message they cannot get out of the message until they respond to prompts to "Listen Again". "Save" or "Discard" before being presented with the next Messages. If they disconnect prior to a decision, the Message is not "Saved", nor "Discarded" but remains in the Mail Box as a "New Message".

The major class of users (U-USER CLASS, USER Record) are "A"uthors. All Authors have a parent company "sponsoring" them who are "Clients" of the Home franchise. The Client is the entity responsible for payment to the Home for the use of the A:\Scribes system by the Authors. Therefore, it is the Client that grants the permissions for the different types of things that the Author might request the system to do and the different types of input/output that the Author might wish to have. An Author can always do transcription and always do Voice-Mail Send. Some Authors can do Voice-Mail. Send to Foreign HOMEs. Some Authors can transcribe and, using their dictation, send Voice-Mail Reports whereupon the recipient of the Voice-Mail Report can request a printed transcript of that Voice-Mail when it is available by fax-back. All Authors can initiate a transcription job (provide the system with the necessary log-on and job-type information through voice response to pre-recorded prompt messages or through tone signals) and then either dictate in real-time or tape-stream their pre-recorded dictation. Some Authors can add file input to their transcription job which can be in the form of document files, or any form of multimedia, including an audio file from broadcast radio, television or internet. Multimedia could also include webpage information, video, audio, radiological imaging, graphics, statistical information from computer files, and faxed files. Some Authors can preview their transcribed document or transaction by fax-back or e-mail attachment prior to the transcription being made available to the Client for retrieval. Some Authors can initiate a job from a Foreign Home. Some Authors (using free-form templates) can direct the placement of the transcription and the formatting of the document through single signal plus voice command or through multiple signals corresponding to the commands of a publishing software program such as Microsoft Publisher® for Section Break, Page Break, Headings, Paragraphs, etc. All Authors can listen to their Voice-Mail. Some Authors can listen to their Voice-Mail on their own Home from a Foreign Home. Authors respond to Voice-Mail Inquiries from Scribes processing their transcription jobs with Voice-Mail Replies (neither Author nor Scribe knows the U-USER-ID or the Home location of either's Voice-Mail Box in a preferred embodiment). If the Author-Listener is the recipient of a Scribe Query Request, the Scribe's Mom, Home, and Mail-Box address are "attached" to the message for an immediate response (as prompted by the system) by the Listener to the Scribe. The incoming Voice Message to the Author had an Electronic Worker pre-recorded substitute for the Scribe's Name Header . . . (as "Scribe Query Request") and the JOB ID was generated by an Electronic Worker for the Subject Header. The Listener is put into a loop and must respond to the Scribe Query Request. If the Listener disconnects, the message is saved as "New" in the Listener's Mail Box and the entire message is copied and placed in a pre-designated Client User's Mail-Box from the CLIENT Record; C-CONTACT-INFO fields. A transaction is made to MOM updating the status of the Job, as "Scribe Query Request Received, but Unanswered".

An example of an AUTHOR with the most processing steps are Radiologists who dictate their diagnostic report of a patient's film, allow it to be "listened to" by a number of other doctors who need to have the Radiologist's finding prior to its being transcribed and then can request a "copy" of the transcribed report for their files by fax-back. The Radiologist may request to preview the transcription before it is made available to the other doctors or to their Client Hospital's Record Management System. If the Listener is the recipient of a Voice-Mail Report they will be informed when it is ready for fax-back during the course of their interaction with the system.

AUTHORS are responsible for supplying their own fax document when they request FAX Input with the job by fax transmission at the end of their Voice-Mail Rejection (if it includes a fax) or at the end of their dictation (if it includes a fax input). Authors are not responsible for transcription file receipt/retrieval or Record Management. For example, if the Author was an attorney dictating a memo to a paralegal regarding a faxed contract, the attorney could read in her comments and attach the fax. Optionally, the faxed contract would be preserved as an image file, or, if desired, presented to the Scribe as content to be transcribed or processed.

If an AUTHOR is giving a live dictation they can give signals to "record", "mark", "reverse" (1 second intervals), "Reverse to "Mark", "play", "forward" (3 second intervals), "Forward to Mark," "Page", "Section", "Pause", "Resume" and "End". After a Pause signal is received, if there is no "Resume" signal within 20 seconds the call is disconnected. Streamed-Tape dictations use the "Pause" and "Resume" signals to allow for Author manual input of the next tape side. The "Paused" dictation remains in the Author's Dictation In-Box under the JOB-ID until when the Author starts another Dictation Job, DAD asks the Author, "Do you want to resume JOB-ID nnnnn", If the response is, "No", then DAD asks, "Do you want JOB-ID nnnnn saved?" Then if the Author makes the decision to save it (DAD responds "JOB-ID nnnnn is saved for 30 days"). Else it is Discarded. DAD assigns a new JOB-ID to the new Dictation. If the Author is continuing with the Dictation Job, they will position themselves with the editing commands described at the beginning of this paragraph. On receiving the "End" signal from the Author, DAD moves the VOX out, creating a Job Transaction Skeleton Record and pulling out the Author's Template from HIS and sends the complete Job Package to MOM via FTP. If the Author is still connected after they have given the "end" signal, DAD asks, "Would you like to Dictate a new Report?" If the answer is "Yes", DAD assigns the new JOB-ID and gives the JOB-ID to the Author . . . "Your new Job-ID is nnnnn"., and begins the process of determining the type of dictation job required. If the answer is "no", DAD asks the Author to signal the process that is to be initiated.

"G"roup Users can send and receive Voice-Mail to Client Users in their Group and to Author users in the group by address (1–16) or by broadcast to Client (1–16) or by Broadcast to all Clients. They are not responsible for any part of any Job. Except for their initial activity in setting up their status as a User, they are non-participating observers of the A:\SCRIBES system as it pertains to their Clients.

"C"lients are Users of Voice-Mail to any other User in their Client's Database, and to any other user of another Client's database within the same Client's Group. They can send Voice-Mail to Users in their CLIENT Database, or within their Client Group on the GROUP Database by a specific Voice-Mail Address (from 1 to 16) or they can Broadcast to a U-USER CLASS in their CLIENT Record, based on their U-USER-SUB-TYPE in the USER Record. Clients can also send Voice-Mail to any of their HOME's personnel (Home-Owner, Coordinators, Financial Manager and Salespeople). Examples of CLIENTS are Hospital Administration personnel and Hospital Computer Records Management personnel. Clients are responsible for transcription file receipt/retrieval and Record Management. Clients are also responsible for making Author-requested input files available on their Client/Author/Template/Input/JOB ID (lowest level ID generated by MOM on receipt of the Job from the Home (cleared out after Job is accepted). Clients are the recipients of Electronic Worker Messages generated by MOM(s) in reference to certain steps in the progress of a Job.

"S"cribes are Users of Voice-Mail to their HOME's personnel and to Authors also, but only in the form of system generated "Scribe Query Request" transactions. In the latter case, Scribes can include a "Clip" of relevant sections of the Author's Audio File about which they have a query. A Scribe's "Client" is their Home, and the Home Franchise can grant them permission to send Voice-Mail to other Scribes within their Home through U-USER-SUB-TYPE field as "H" indicating they can communicate with other Scribes of their Home. If the U-USER-TYPE field is "M" they have permission to communicate with other Scribes at other HOMEs under their MOM; and if "S" they have permission to communicate with any Scribe anywhere. Scribes are the recipients of Electronic Worker Messages generated by MOM(s) or SUPERMOM in reference to certain steps in the progress of a Job in the form of e-mail, voice-mail or calls to a phone number or pager.

"P"ersonnel of a Home are Voice-Mail Users. Their Home is their "Client". They can send Voice-Mail to other Personnel of the Home by address or Broadcast. Whether they can send Voice-Mail to other classes and other HOMEs depends on their permissions in their USER Record. Certain Personnel in the Home are responsible for setting up the different records for the different Classes of Users in their Home on the HOME's Database; they are assisted in this creation by transaction Input to the A:\SCRIBES system from the Users themselves when they set up their "accounts" on their initial "visit". Certain personnel are responsible for the creation of Template Files for the Authors. Personnel are recipients of Electronic Worker Messages generated by their MOM.

Groups, Clients, Authors and Scribes have access to their Home Site's Internet Directory. Clients and Scribes can upload and download from their directories. Groups and Authors can view their directories. Groups, if spread over more than one MOM, view their directory from SUPER-MOM Site.

SUPERMOM maintains a Job Status Site where Clients and Authors can check on the current status of a Job that belongs to them (much like the Fed-Ex shipping Tracking System that is available to Fed-Ex customers through the Internet, today).

MOMs maintain Account and Statistical Information for Clients, Authors, and Scribes with input help from SUPER-MOM for those Scribes who have worked for other MOMs. SUPERMOM maintains Group Sites for Groups whose Clients spill over into other MOMs with HotLinks to the Client Sites.

MOMs maintain Account and Statistical Information for their HOMEs with input help from SUPERMOM.

In a preferred embodiment, MOMs pay Scribes through Direct Deposits for work the Scribes did for MOMs' Clients. In the Case of Scribes doing work for Foreign MOMs, the Foreign MOMs make payment to the Home of the Scribe through SUPERMOM and the Scribe's Home then makes the payment to the Scribe.

Scribes begin their work with their Home by initiating their Voice-Mail Box and by building their Scribe Database Record through a Transaction session where the Sribe is prompted for response. Home Personnel add information to the Scribe Database Record through a Live Transaction Session with their Home Information System (HIS). Ater the Scribes are on the Database and after the Home Site's Scribe Directory is in place, the Scribe is given instructions for first accessing the Site. At that time the Scribe accesses their form where certain information is displayed and certain information is input by the Scribe: Scribe's contracted work schedule, beginning and ending date for that schedule; Scribe's "ON-LINE BUTTON" and "OFF-LINE BUTTON" and HotLinks to other information and functions. The Scribe will download the software needed to work in the A:\SCRIBES environment.

When the Scribe sits down at their computer to begin a work session, they will dial-in to their local internet provider. They will then go to their Scribe Home form where they will click on the ON-LINE BUTTON. The next screen they view is their Directory. Any jobs in the input directory are to be downloaded by priority indicated. They download all files for a Job. Only one Job at a time is to be worked on unless a previous Job is "waiting for a Query Reply" (from the Author). The Scribe proceeds with the transcription, and if necessary initiates a Scribe Query Request transaction, "clipping" the portion of the Real-Audio® file in question. If the Scribe has more Jobs that they could be doing, they will be able to download another Job as soon as their HOME's MOM receives a Scribe Query Status Transaction from the Home. When the Scribe has finished the Job they upload the file to their Output Directory where it will stay until it is accepted unless it has been targeted by HOME personnel for "proofing". If the Scribe signs off before a Job has been accepted and the Time-Out will not occur until after x minutes of their scheduled sign-on, the Job remains in their directory. If the Time-Out will occur while they are unavailable, the Scribe is advised that the Job is subject to rejection while they are off-line and the correction will be given to another Scribe unless they sign-on within x minutes of being advised that their Job has been rejected. When the Scribe closes their session they go to their form where they click on the "OFF-LINE" button.

During the Scribe's creation of the Transcription, they can adjust the volume and speed of the Real-Audio® file through a control window on their screen. They can optionally use a hardware foot treadle that controls the Real-Audio® file for "stop", "play", "reverse", "fast reverse", "fast forward" or they can use a software speaker-independent voice-recognition command system for accomplishing the same effects (new technology).

If the Job that the Scribe receives has been pre-transcribed either through a human transcriptionist or through and independent speech computer software program the transcribed document is viewed on her screen in synchrony with the original speech.

The Scribe receives Electronic Worker Messages by Voice-Mail and by E-Mail from MOM or SUPERMOM advising of work or Job Status . . . "You have new work-(x) priority work, JOB #nnnnn"; "Yu have a Reply for JOB #nnnnn"; "Your Job"# nnnnn was rejected at nn nn hours", etc.

If a Job has been targeted for Proofing" the entire job output and input is transferred to the Proofing Scribe who will now be responsible for the job through acceptance. The original Scribe's output will be compared with the Proofing Scribe's output for statistical comparison results. Both Scribes will be paid for their effort at each of their contracted rates for both transcription for the template and for proofing of the template.

Scribes are contracted to be available for work certain days of the week, certain hours of the day. However, they do take leaves and they do take emergency time-off and they may need to reschedule their work contract. The Scribe advises their Home of a next Leave to come, and if possible, emergency Time-off in advance, by updating their Scribe Form by entries to the S-P-OFF DATE: and S-P-NXT ON DATE fields, and if applicable by entering a proposed contract schedule in the corresponding form section. The form editor software edits the entries for completion and logic and when the Scibe enters the data, the program creates an Electronic Worker Message for delivery to the Home Scribe Coordinator (personnel) giving the Scribe User ID and Subject (1) time-ff or (2) if the proposed new schedule decreases either hours worked in a day or days worked in a week. Home personnel will cause the program to replace the existing schedule with the proposed schedule after communicating with the Scribe and getting a new electronic contract "signed". Home Personnel cannot have the access to otherwise change the Scribe schedule fields.

Scribes are pre-qualified through a public set of interactive web-site Scribe Evaluation Programs (new technology) where they can register for the opportunity for contract biddng with A:\Scribes Corporation. When a Scribe is a successful bidder and secures a contract with a local HOME they are guaranteed at least the lowest level of expected competency of template transcription jobs. To bid for a higher level, they will take that higher level's set of interactive web-site evaluations. If they qualify they will secure an amended contract with the HOME and they will become a Provisional Scribe for that higher level. A Provisional Scribe earns money transcribing at their prior lower levels of work, and in addition "shadow" Assigned Scribes at the higher level of work periodically when their work load permits them to do so. The HOME's personnel updates their Scribe Record with the information that they are a Provisional Scribe at the higher level. The Scribe initiates a shadow transcription through her Scribe form web site, MOM builds a Sub-directory in the Scribe's Directory as a Provisional Directory and hands the Scribe a Job that is being done by an Assigned Scribe. Mom takes the Assigned Scribe's finished transcription and puts it in a sub-directory of the Scribe for comparison with the Provisional Scribe's output, along with Job statistic information that would be critical to the evaluation process. Mom initiates a comparison program to be run giving the outcome in report format which is available to the Provisional Scribe as well as her HOME. It is up to the Home to decide whether and/or when to accept the Provisional Scribe's bid to contract for the higher level of work.

"GUEST"s access the system from POT lines to request the fax-backs of documents that have been made available by User-Author's. The Author indicates during the dictation session that there will be guests requesting fax-backs of the transcribed document. The system generates a password along with the generated Document ID and announces both and the expiration date to the Author who will be solely responsible for supplying that information to any number of guests that he wants to receive the document. The system will keep track of the number of guests using the system by document, author, department, client, and group for applying charges to the Job.

Referring now to FIG. 1, which shows a representation of a preferred embodiment of the present invention. SuperMom 101 is connected to the Internet backbone 102. Mom (East) 103 is connected through the Internet to SuperMom 101. A redundant Mom East 104 is located in a geographically different area, and potentially on a different area of the Internet to minimize the likelihood that a power interruption, cut cabling, etc. will stop information from transactions from reaching both Mom East 103 and redundant Mom East 104. It is important to note that redundant Mom East 104 is preferably redundant, and not merely a mirrored site. Mom West 105 serves another region. Scribes 106 can preferably work from home, or potentially from sites housing small groups of Scribes 107. A Scribe 106 can have a first connection 108 directly to the HOME 109 or a second connection 110 to an Internet Service Provider 111. Authors 112 preferably connect directly with the HOME 109 via a telephone connection. Institution 113 connects to the HOME 109 via phone lines 114 and/or a connection 115 to the Internet.

Coding Sheets Explanation

The Symbolic Language Processor is a decision table translator and pre-compiler program created by Howard I. Bryson. While following specific SLP "grammar" it can be used by a systems designer using plain English, and it can be used by a programmer using a specific coding language such as COBOL, Basic, PL/1, etc. The Processor sorts the coded input first by Section (Environment, Files, Data, Tables, Procedures.) and then by line number. The Processor checks for "grammar" completeness and use in the statements and for complete option paths in the table rules. This pre-compile step catches clerical errors and points out logic errors for redundancy or incompleteness.

The translator step takes the coded Tables and Procs and builds sub-programs from the procedures and tables: the name of the Procedure or Table is the starting point of execution; "Comment" lines will be generated as comments in the appropriate language of the program compiler; "Prefix" tag will be generated as "Tab-nnn-Prefix" step-name, and statements within the prefix will not be re-arranged or re-coded, but will be direct input to the final program compiler; "Tests" tag will be generated as "Tab-nnn-Tests" step-name; "Actions" become "Tab-nnn-Actions" step-name; "Exit" becomes "Tab-nnn-Exit" step-name followed by an address used for return to the next in-line code of the calling program. The processor re-arranges the tests according to the requested priority coded in the Rules which will be explained below.

Procedures (PROCS) are coded on plain coding sheets. Line numbers are filled in by the coder. The coder must assume that the coding statements will be sorted by line-number in the pre-compile process—just like any program coding sheet. See FIG. 2A.

The entrance to a procedure is the first line of code following the Proc-nnn step-name. The usual exit from a procedure is at the Exit Proc-nnn-Exit step-name, where the address of the calling program's next in-line statement is dynamically placed during execution of the program by the calling sub-program. The processor assigns any coded step-name a prefix of "proc-nnn" (from the title), therefore the coder does not. The coding language in a Procedure is exactly the way it must appear to the final program compiler-SLP does not translate procedures. See FIG. 2B.

Tables (TABs) are coded on decision table coding sheets which has three main sections. Prefix, Tests and Actions. Line numbers within sections are filled in by the coder and therefore the coder must assume that the result makes sense when the lines are sorted by number. Rules are vertical one-character sub-sections of Tests and Actions. Theoretically, there can be any number of rules, but practically, 16 is a good maximum for any one table. The Translator sorts Rules by the coded priority to generate condition and action statements that are in accordance with the wishes of the coder. See FIG. 2C.

"Tests" Section coding contains a statement to be tested according to the conditions coded in the Rules sub-section per line; a line is considered complete on encountering a period. Therefore a statement can span several lines while the conditions to be tested are coded on the line that ends with a period. The statements usually contain an "Operator" and the Rules contain an "Operand". See Table 1.

"Actions" Section coding contains a statement to be executed (can span several lines) according to the action numbers assigned in the Rules. The numbers are significant in this regard: The lowest number action for that condition will be executed first and conversely, the highest number action for a condition will be executed last. Equal actions numbers can be executed in any order. See FIG. 2D.

TABLE 1

| OPERATOR | OPERAND |
|---|---|
| VS (versus) | E (equal to) |
| | H (higher than) |
| | L (lower than) |
| | N (not equal to) |
| | I (not greater than) |
| IS (condition) | M (not less than) |
| | (don't care) |
| | T (true) |
| | F (false) |
| | (don't care) |
| Statement with no operator | U (unconditional action) |

TRANSLATION EXAMPLE: Using TAB-WD (on FIG. 2D): The Table is entered at the top and the first coding that will be executed is in the Prefix—an "on 1" statement that is used extensively in the AEDP flow documentation: The expression is similar to the awk scripting programming language "do statement while (test)" in that the statement is executed and then the condition is evaluated resulting in a one-time-switch preceding a statement that cannot be executed again unless the "switch" is reset. It is also similar to other programming languages' "on (the count of) 1 until (the count of) 1" conventions.

The next coding that will be executed will be after the "TAB-WD-TESTS" step-name that will be generated by the processor. The first "IF statement" that will be generated is not going to be the first statement that is coded due to the "Probability" numeric codes that have been placed in the Rules: the coder is asking the generator to place the question and actions associated with Rule 1 as the first coding to be executed, and the question and actions of Rule 2 to be placed for execution after all other questions could possibly be asked. In this case, the coder is overstating, for purposes of example, that the probability of being disconnected is a #1 probability, so that if there has been a disconnect, the other questions and actions are not executed and the path treats the exception and exits back to the calling program. The coder believes that the most likely probability is that the Author is associated with only one department. The reason the coder did not write the questions in order of probability is for clarity of the reader and ease of coding a complete decision table accounting for all possible decision outcomes. The reason that the coder went to the trouble of giving probabilities at all is for the program to execute its steps in the most efficient manner of time rather than space if the distinction should become necessary in the translation. Giving equal probability to any rules means that the coder believes that there is equal probability that any one of those paths will occur.

The following is an interpretation of the paths following TAB-WD-TESTS step-name entrance:
1) IF (NOT) STILL-CONNECTED
   PASS TABLE-WD-COND/1" TO PROC-DIS,
   GO TO TAB-WD-EXIT.
2) IF STILL-CONNECTED
   AND EXCEEDED # OF DEPARTMENT FIELDS IS TRUE
   ANNOUNCE: "There are no more selections, we'll start over",
   RESET TAB-WD-PREFIX-SWITCH,
   GO TO TAB-WD-EXIT.
3) IF STILL-CONNECTED
   AND EXCEEDED # OF DEPARTMENT FIELDS IS FALSE
   AND AUTHOR HAS MULTIPLE DEPARTMENT IS FALSE
   USE DEPARTMENT RECORD SELECTED
   RESET TAB-WD-PREFIX-SWITCH,
   GO TO TAB-WD-EXIT.
4) IF STILL-CONNECTED
   AND EXCEEDED # OF DEPARTMENT FIELDS IS FALSE
   AND AUTHOR HAS MULTIPLE DEPARTMENT IS TRUE
   UNCONDITIONALLY, PROMPT FOR DEPARTMENT (FIRST) 3 TRIES
   ELSE "NO",
   THEN IF DEPARTMENT RESPONSE IS "yes"
   USE DEPARTMENT RECORD SELECTED,
   RESET TAB-WD-PREFIX-SWITCH,
   GO TO TAB-WD-EXIT.
5) IF STILL-CONNECTED
   AND EXCEEDED # OF DEPARTMENT FIELDS IS FALSE
   AND AUTHOR HAS MULTIPLE DEPARTMENT IS TRUE
   UNCONDITIONALLY, PROMPT FOR DEPARTMENT (FIRST) 3 TRIES ELSE "NO",
   THEN IF DEPARTMENT RESPONSE IS "no"
   STEP UP DEPARTMENT,
   GO TO TAB-WD.

Please note that the coder has to cover all possible paths for completeness using binary arithmetic logic (2 statements give 3 possibilities of T/F combinations; 3 statements give 7; 4 give 15, etc.). However, blank conditions such as displayed here on the left side of the Rules are interpreted by the processor as "0̂" (carets) the sign for "I don't care", so that the coder does not have to complete the sets for all statements if the leading condition for the statement is met (Rules 1,2,3 have implied "don't cares" under the lead condition).

The Processor would translate the above more efficiently than translated here so that the question: "Still connected?" would not be repeated, once the answer was found to be negative. Likewise, the question: "Exceeded # of Departments?" would not be repeated once the answer was found to be true, and so on with "# of departments," till finally the statements in (5) would be reduced to "Else, step up department, go to tab-wd" so that unnecessary programming steps would not be executed for every running of the program.

FIGS. 4 through 54 thoroughly show major portions of a preferred embodiment of the present invention as contemplated by the inventor. The most complicated path, that of an Author, is presented in great detail. One of ordinary still in implementing such a system should, with the aid of the coding sheet instruction contained herein, be able to create appropriate program code so as to implement the system.

The attached FIGS. 54 through 59 show the structure of the database records of a preferred embodiment of the present invention. FIG. 54 shows the structure of MOM database records. FIG. 55 shows the structure of GROUP database records. FIG. 56 shows the structure of CLIENT database records. FIG. 57 shows the structure of DEPARTMENT database records. FIG. 58 shows the structure of USER database records. FIG. 59 shows the structure of SCRIBE database records. Different implementations of the system would likely contain such fields, information, and relations as necessary to meet the design of the particular embodiment implemented.

FIGS. 60 through 60I show the structure of the Job Transaction Record. A carefully designed Job Transaction record allows the record to support many functions. Billing, payroll, tracking royalties, use rights, historical record of the job steps that occurred, making a basis for analysis of efficiency (e.g. Scribe, Author, Home, as previously discussed).

FIGS. 61 through 61F show a preferred method of the present invention of assigning Jobs to available Scribes.

While the above provides a full and complete disclosure of the preferred embodiments of this invention, equivalents may be employed without departing from the true spirit and scope of the invention. Such changes might involve alternate databases, processes, criteria, structural arrangement, capacities, sizes, operational features, reports or the like. Therefore the above description and illustrations should not be construed as limiting the scope of the invention which is defined by the appended claims.

What is claimed is:

1. A system for automatically managing workflow, comprising:
    a first computer that generates a job packet containing a set of computer-readable indicators that represent a user-specified set of job steps associated with a current job; and
    a central computer that receives the job packet from the first computer, selects a scribe from a list of available scribes, and automatically forwards a job request to a scribe computer associated with the selected scribe, the job request containing an electronic file to be processed by the selected scribe;
    wherein the first computer and the scribe computer are coupled to the central computer via a global communications network, wherein the job is assigned a priority designation, and wherein the central computer transmits a status inquiry to the scribe computer to determine whether a current job step can be performed in accordance with the priority designation and, if the central computer determines that the current job step can not be performed in accordance with the priority designation, then the central computer forwards the job request to a second scribe computer.

2. The system of claim 1, wherein the scribe computer forwards a processed electronic file to the central computer, and wherein the central computer automatically disposes of the processed electronic file in accordance with the set of job steps.

3. The system of claim 1, wherein the central computer maintains and stores the list of available scribes.

4. The system of claim 3, wherein the central computer receives scribe availability data from the scribe computer, and maintains the list of available scribes based on the scribe availability data.

5. The system of claim 1, wherein the job packet contains a priority designation associated with the electronic file to be processed by the selected scribe, and wherein the central computer selects the selected scribe based on the priority designation.

6. The system of claim 1, wherein the central computer tracks a current status of the job based on a respective current status of each of the job steps.

7. The system of claim 6, wherein the central computer modifies the set of job steps based on the status of the current job.

8. The system of claim 7, wherein the central computer modifies the set of job steps based on a priority designation associated with the electronic file.

9. The system of claim 1, wherein the central computer initiates a next job step based on completion of a current job step.

10. The system of claim 1, wherein the central computer reinitiates a current job step based on a determination that the current job step has not been completed.

11. The system of claim 1, wherein the central computer receives a job modification request, and modifies the set of job steps based on the received job modification request.

12. A system for automatically managing work flow, the system comprising:
    a local computer that receives job instructions from an authorized user and generates a job packet containing a set of computer-readable indicators that represent a set of job steps associated with a current job; and
    a central computer that
        receives the job packet from the local computer,
        automatically forwards to a remote computer a job request associated with at least one of the job steps, the job request requesting performance of the associated job step, and
        tracks a current status of the job based on a respective current status of each of the job steps;
    wherein the local computer and the remote computer are coupled to the central computer via a global communications network, wherein the job is assigned a priority designation, and wherein the central computer transmits a status inquiry to the remote computer to determine whether a current job step can be performed in accordance with the priority designation and, if the central computer determines that the current job step can not be performed in accordance with the priority designation, then the central computer forwards the job request to a second remote computer.

13. The system of claim 12, wherein the central computer changes the priority designation before forwarding the job request to the second remote computer.

14. The system of claim 12, wherein the central computer provides the current status to a user of the system via the global communications network.

* * * * *